March 19, 1935.  R. A. HAWN  1,994,516
DRILLING TOOL
Filed May 2, 1932
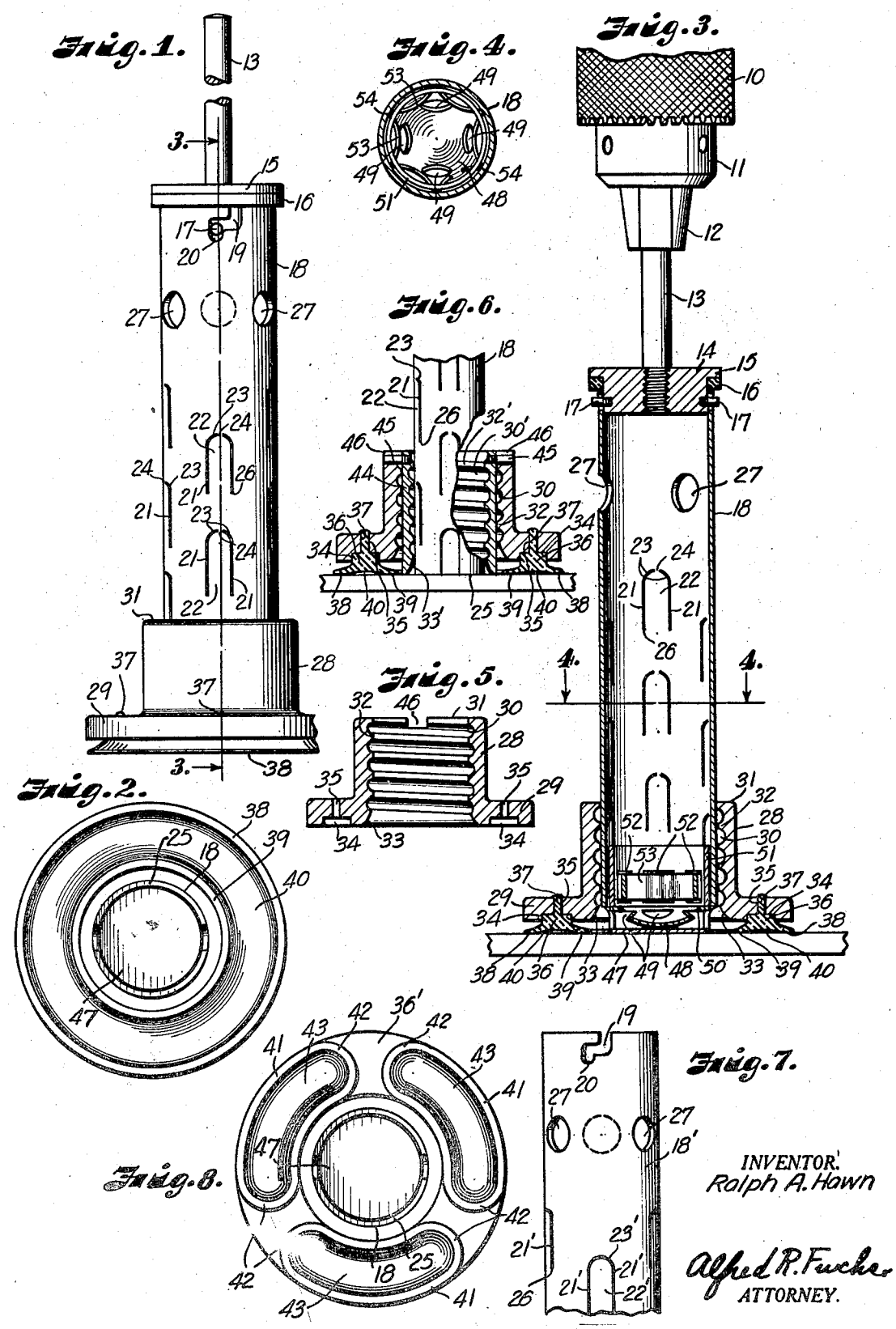
INVENTOR.
Ralph A. Hawn
Alfred P. Fucher
ATTORNEY.

Patented Mar. 19, 1935

1,994,516

UNITED STATES PATENT OFFICE 1,994,516

DRILLING TOOL

Ralph A. Hawn, Birmingham, Mich., assignor to The Ceramic Drill Company, a corporation of Missouri Application May 2, 1932, Serial No. 608,729

11 Claims. (Cl. 125—20)

My invention relates to drilling tools, and more particularly to a drilling tool that is particularly adapted for drilling holes in glass or similar materials.

It is a purpose of my invention to provide a new and improved drilling tool of the character set forth, which is of a portable character and is adapted for drilling holes in any portion of a pane of glass no matter how large the same may be, and which does not require the clamping of the glass, which would limit the drilling of holes to points adjacent the peripheral edge of the pane in a portable drilling apparatus.

It is another purpose of my invention to provide a drilling tool of the character set forth, which is rapid in operation and simple in construction and which will drill a clean cut hole in glass of any thickness or any material of a similar character.

It is another purpose of my invention to provide a portable drilling tool for glass or similar materials, which utilizes a drilling compound or abrasive material which is ordinarily applied in a paste-like form and mixed with water, said drilling tool being provided with combination guiding and guard means to prevent the throwing of the abrasive material about by the drill.

It is still another purpose of my invention to provide a drilling tool of the above mentioned character comprising a tubular drilling or bit member, which has a notched edge portion for cutting purposes, but which is provided with a substantially closed wall portion from the cutting edge thereof to a point remote from the cutting edge so that the drilling compound and water used in conjunction therewith will not be thrown out through openings in the side wall of the tubular bit. The tubular bit wears as the drilling is carried on, and in order to provide for notches in the cutting edge of the drill, means is provided whereby such notches are assured in said edge during the entire life of the drill as it wears down on the cutting edge thereof.

It is a particular purpose of my invention to provide a tubular drill of the above mentioned character, which has slits therein to provide weakened portions which can be pushed out or will drop out of the wall of the drill as the same wears, so as to always provide notches at the cutting edge of the drill at all times and yet not unduly decrease the strength of the wall of the drill. The weakened portions formed by the slits are staggered in adjacent rows running around the drill bit and are so arranged relative to each other that the same overlap lengthwise of the drill bit. Accordingly, as one row of notches disappears due to wear on the edge of the drill, another row comes into play due to the fact that the wear has entered a new set of weakened portions, which cause small areas of the wall to be released so that the same will drop out leaving new notches, or can be pushed out to provide new notches, in the edge of the drill bit.

It is another purpose of my invention to provide a drill of the above mentioned character having a guide member provided with suction means for holding the same in position on the glass or other member that is to be drilled, said suction means preventing shifting of the drill on the material that is to be drilled, and also eliminates the necessity of any clamping means or similar apparatus for holding the drill in position relative to the material worked on. While the suction means may be made in the form of a continuous annular suction ring or suction cup, preferably a plurality of annularly arranged suction cups are provided to permit the drilling of holes very close together. The suction member also serves as a cushioning means between the guide member and the work, and will indicate to the operator whether the drill is being held straight or not, inasmuch as any tilting of the drill out of proper alignment with the guide member will cause compression of the yieldable suction means on one side of the guide member such that the guide member will be tilted sufficiently to release the suction means on the other side thereof, thus releasing the guide member from the work and warning the operator that he is not drilling straight.

It is a further purpose of my invention to provide a guide member which is provided with a beveled inner corner to provide an annular passage between the guide member and the drill in which the drilling compound is adapted to accumulate and mix with water to form a cutting mixture on the outside of the tool, as well as on the inside thereof. It is also a purpose of my invention to provide said guide member with a spiral groove therein, which is adapted to serve as a storage chamber for excess drilling compound, preventing the escape thereof between the top of the guide member and the drill. Furthermore this spiral groove serves as means through which water or other liquid may be inserted into the device adjacent the cutting edge of the drill bit, and furthermore prevents undue wear on the guide, as the abrasive will not work in between the engaging surfaces of the guide and drill bit, but will stay in the grooves. This is very important, as it prevents such wear on the guide member as would interfere with the proper fit between the guide member and the tubular drill bit, which would otherwise cause a loose fit such that the guide member would not properly guide the bit.

It is another object of my invention to provide means for holding or retaining drilling compound within the drill, said means being provided with means to engage the drill bit so that the drilling compound or retainer will turn with said bit, but will also move inwardly in the bit as the cutting edge of the bit wears, this being accomplished by providing resilient means on the compound retainer engaging the inner surface of the tubular bit frictionally.

It is also an object of my invention to provide a drilling compound retainer that has a cup-like portion in which the drilling compound is placed and which is provided with openings therein so located that the drilling compound will be thrown outwardly through the openings toward the cutting edge of the drill bit as the same is rotated, said retainer being so shaped that the centrifugal force will tend to drive all of the paste-like drilling compound through the openings therein outwardly toward the cutting edge of the tubular bit.

It is still another object of my invention to provide a detachable connection between the tubular drill or bit, and a head portion provided on a drill stem, which is adapted to be secured in a chuck in the ordinary portable drill, said detachable connection being preferably made by means of a bayonet slot connection and there being preferably cushioning means between the head and the tubular bit, which will take up the shock due to uneven drilling because of variations in the glass and so on.

It is another purpose of my invention to provide a spiral groove in the guide member that is made so as to have a pitch corresponding to the direction of rotation of the drill. Thus, if the drill turns in the ordinary right hand direction or has a right hand rotation, the spiral groove in the guide member is made similar to a right hand thread, whereby the compound and water mixture is prevented from traveling up between the guide and the bit in the groove, the rotation of the bit tending to move the material downwardly in the groove rather than upwardly in the same.

It is a further purpose of my invention to provide means for adapting the guide member to different size drill bits, said adaptors being provided with spiral grooves similar to the spiral groove in the guide member above mentioned.

It is another object of my invention to provide the guide member with a groove for receiving the rubber suction ring, and with means for receiving projections on the suction ring such that the suction ring will be held from disengagement from the guide member accidentally.

It is another object of my invention to provide a tubular drill with a substantially closed side wall portion throughout the major portion of the length thereof with ventilating means in the tubular wall remote from the cutting edge thereof, whereby undue heating of the tool is avoided.

Other objects and advantages of my invention will appear as the description of the drawing proceeds. I desire to have it understood, however, that I do not intend to limit myself to the particular details shown or described, except as defined in the claims.

In the drawing:

Fig. 1 is a view in side elevation of my improved drilling tool, the stem portion being partly broken away.

Fig. 2 is a bottom plan view thereof.

Fig. 3 is a view partly in longitudinal section and partly in elevation of my improved drilling tool, showing the same in engagement with a portable drill.

Fig. 4 is a section taken on the line 4—4 of Fig. 3.

Fig. 5 is a vertical sectional view through the guide member, with the suction producing means removed.

Fig. 6 is a fragmentary longitudinal sectional view of the drill bit and guide member, showing an adaptor for a smaller drill associated therewith.

Fig. 7 is a fragmentary side elevational view of a modification, and

Fig. 8 is a view similar to Fig. 2, showing a modified form of suction holding means.

Referring in detail to the drawing, my improved drill is shown as being applied to a portable drill, such as an electric drill 10, having a chuck 11 provided with jaws 12 that receive the stem portion 13 of my drill. Said stem portion 13 is provided with a head 14, which is shown as being made in the form of a disk-like member that is threaded onto the stem 13, although, obviously, the connection between the stem and the head can be made in any other desired manner.

The head portion 14 has a flange 15 thereon defining a shoulder, against which the compressible gasket or cushioning member 16 is seated, the same being preferably made of a ring of rubber or similar compressible material. Said head 14 is further provided with a plurality of pins 17 or similar projections thereon. The drill bit 18 is made tubular in form and is provided with slots 19, which are substantially bayonet slots, being provided with an offset 20 in the inner end thereof in which the pins 17 seat when pressure is applied to the drill due to the compression of the gasket member or cushioning member 16.

The tubular drill 18 is provided with a plurality of slits 21 therein, which are arranged in pairs to define weakened portions 22 between pairs of said slits, said slits 21 having inwardly curved converging end portions 23, which are slightly spaced, as at 24, in the form of drill bit 18 shown in Figs. 1, 3 and 6. The lowermost set of slits 21 extend to the bottom edge 25 of the bit, thus forming elongated openings or notches therein at said cutting edge 25. The slits 21 may have the converging ends spaced as shown in Figs. 1, 3 and 6 so that the weakened portions 22 can be pushed out at the cutting edge of the bit to disengage the same from the cylindrical body portion of the bit to provide the notches in the cutting edge thereof. This arrangement is desirable to prevent any loose pieces of drill bit from dropping out of place during the drilling operation, which might interfere with said drilling operation. It has been found, due to the character of the device otherwise, that if the complete apparatus shown is used, this is not absolutely necessary, however, and the drill bit may be made as shown in Fig. 7. The bit 18' shown in Fig. 7 is provided with U-shaped slits 21' having the curved end portions 23', and it will be evident that when this form of bit is used the weakened portions 22' will be released completely as soon as the bit wears down to the ends 26, of the slits 21 nearest the cutting edge. This does not interfere with the drilling operation, however, as the portions that are released will not drop out of place and interfere with the operation of the drill due to the fact that the drill makes a circular channel in the work, which will hold the loose pieces of bit in place in conjunction with the guide member, which will be described below, and the weakened portions 22' will not drop from the bit until the bit is withdrawn from the guide member.

Both the drill bit 18 and the drill bit 18' are provided with a plurality of ventilation openings 27 adjacent the end thereof at which the head 14 is located, these being thus remote from the cutting edge 25. The drill bit 18 or 18' has the cylindrical wall thereof otherwise substantially closed, the slits 21 being only cuts in the wall thereof, which do not provide openings of sufficient size that any abrasive or cut away portions of the material that is worked on along with the water or other liquid used in the drilling operation will escape therethrough. The ventilation openings 27 are necessary, as the bit would heat considerably if no ventilation were provided, because of the closed character thereof.

Cooperating with either the bit 18 or the bit 18' is a guide member, which is also a guard member, to prevent the escape of cutting compound and cut particles of the work, which would otherwise be thrown out laterally by the drill. The guide member is shown separate from the drill in Fig. 5, and comprises a tubular body portion 28 having a base flange 29, which is located adjacent the work. The tubular portion 28 is made to closely fit the bit 18 or the bit 18', being made only sufficiently larger than said bit to permit free rotation and free sliding movement of the bit within the guide member.

The tubular body portion 28 of the guide member is preferably provided with a spiral or helical slot 30 therein, which extends from the end 31 of the guide member remote from the cutting edge of the drill to the end of the guide member having the flange 29 thereon, thus providing a long circuitous passage in the inner wall of the guide member. The portions 32 of the inner wall of the guide member between the turns of the groove 30 provide the bearing for the drill bit 18 or 18'. The guide member furthermore has the corner between the face of the guide member adjacent the work and the inner wall of the guide member beveled at 33, to provide an annular chamber between the bit 18 or 18', and the guide member adjacent the work.

Said guide member is further provided with an annular channel 34 in the flange 29, which has openings 35 extending therefrom through said flange to the side thereof remote from the channel 34. Seated in the channel 34 is a cushioning suction ring of compressible material, such as rubber, the body portion of said ring being indicated by the numeral 36 and fitting the groove 34 closely. The body portion is provided with stem portions or projections 37, which extend through the openings 35, and are slightly longer than the distance through the flange 29 from the bottom of the groove 34 to the opposite face of said flange. The suction ring is assembled with the guide member by inserting the portions 37 into the openings 35. Upon pulling on said portions or stems 37, the same will be elongated, due to the fact that these are made of rubber, and reduced in cross section temporarily. This enables the same to be pulled through the openings 35, and upon the release thereof the same will again be reduced in length and increased in diameter to fit the openings 35 snugly, thus aiding in firmly holding the suction ring in relation to the guide member. If any of the stem portion 37 is protruding it can be cut off, if this is desired. The suction ring may be made as shown in Fig. 2, in which it is shown as being provided with an annular outer rim portion 38 and an annular inner rim portion 39, defining an annular suction groove or suction cup 40 between said rim portions 38 and 39. By forcing the guide member firmly, but gently against the work the suction cup 40 will be deformed to exhaust the air therefrom, and the rib or rim portions 38 and 39, due to the shape of the parts, will grip the glass or other material in a well known manner to hold the suction ring in gripping engagement with the material due to the suction action resulting because of the difference in pressure externally and internally of the suction cup or annular suction passage 40.

The combination cushioning or suction holding member described above is suitable under most circumstances, and is relatively cheap to make, but where it is desired to drill holes in glass very close together, it is possible that the suction ring having the annular passage 40 may extend across portions of an opening already drilled, thus breaking the suction. In order to avoid this and to make it possible to provide a gripping engagement between the suction device and the work even if the holes are to be drilled very close together, the arrangement shown in Fig. 8 may be used, in which the suction ring is shown as having a body portion 36' similar to the body portion 36, which has a plurality of ribs 41 projecting therefrom, said ribs having concentric inner and outer wall portions connected by means of curved end wall portions 42, and having the inner faces thereof concavely curved to form an elongated suction cup 43 within the rib 41, which rib forms a figure having a closed outline. Thus arcuate suction cups 43 are formed arranged in an annular series about the ring having the body portion 36', and as each suction cup 43 operates independently of the others in the usual manner, it will be obvious that at least one of the cups 43 will be exerting its suction action, no matter how closely the holes in the glass or other material worked on, may be together.

While the guide member 28 is used with the drill bit 18 or 18', it is obvious that the guide member will fit a bit of only one diameter or size, and in order to provide for proper guiding of bits of all sizes, adaptors are provided which will fill the space between the inner wall of the tubular portion 28 of the guide member and a bit of any size. Thus, a bit 18 of smaller size than the bit 18 shown in Figs. 1 and 3, is shown in Fig. 6, and the adaptor member 44 is provided between the guide member and the bit 18.

Said adaptor member is provided with a spiral groove 30' therein made in the same way as the groove 30, and the portions 32' of the inner wall of the adaptor engage the outer surface of the bit 18. The lower edge portion of the adaptor 44 is beveled at 33' in the same way as is the guide member within which the same fits, thus providing an annular passage between the adaptor and the bit in the same way as the beveled portion 33 provides a passage between the bit and the guide member 28 when no adaptor is used. The adaptor 44 is held from rotation relative to the guide member by means of projections, which are shown in the form of pins 45 in Fig. 6, which engage in recesses or notches 46 provided in the edge portion of the tubular member 28 of said guide member remote from the work.

Mounted within the bit 18 or the bit 18' is a drilling compound retainer or holder. This drilling compound retainer or holder is, of course, made of a size to correspond with the size of the bit, and comprises a substantially disk-like base portion 47, which is of a slightly smaller diameter than the inner diameter of the bit 18. The face of the portion 47 of the compound retainer opposite that engaging the work has secured in fixed relation thereto, a concavo-convex or cup-like body portion 48 for receiving the drilling compound, which is usually in the form of a soft paste, and which is made of abrasive and binding materials in a well known manner, the particular compound used not being a part of this invention. The body portion 48 of the holder or retainer is provided with a plurality of elongated slots 49 therein, which are located near the top of said cup-like portion, or the portion remote from that secured to the disk-like member 47.

The body portion 48 terminates in a ring-like portion 50, from which a tubular portion 51 extends, the tubular portion being fixedly secured to the ring-like portion 50 in any desired manner. The tubular portion 51 fits loosely within the bit and is provided with a plurality of openings arranged in a circular series around the same, said openings being indicated at 52. Mounted within the tubular portion 51 is a resilient member made in the form of a piece of flat spring bent to provide the concavely curved portions 53, which are joined by means of apex portions 54, which are oppositely curved to the portions 53, said apex portions 54 extending through the openings 52 and engaging with the inner surface of the bit 18. It will be evident from Figs. 3 and 4 that the resilient member at the apex portions 54 thereof will have frictional engagement with the inner surface of the bit 18, and the spring is made of such strength that this frictional engagement will be sufficient to hold the retainer for the compound as a whole from turning, but will permit the gradual inward movement thereof as the cutting edge of the bit wears.

In operation, the guide member is engaged with the work by pushing the same into engagement therewith, and the drill is inserted in the guide member after the compound retainer has had the cup portion thereof filled with the drilling compound. Water is then inserted between the drill and the guide member or adaptor by squiring the same into the groove 30 or 30', as the case may be, with an ordinary oil can. Drilling is then commenced, and it will be obvious that the centrifugal force, due to the rapidity of the rotation, will cause the paste-like drilling compound to travel upwardly in the cup and through the slots 49, down onto the disk 47 and move outwardly thereon toward the cutting edge of the bit, some of the compound passing outwardly through the notches formed in the bit due to the release of the weakened portions 22 or 22', which provide the notches, and this will mix with the water that has traveled down the groove 30 or 30' into the annular space provided by the beveled portion 33 between the guide member or the adaptor and the bit. The drilling compound and water will thus mix to provide the proper abrasive material for drilling the hole, the drilling compound dropping into the slit formed in the material by the drill, through the notches in the edge portion of the drill. If there is an excess of drilling compound and liquid between the guide member and the drill, it will not be forced into engagement with the engaging surface 32 of the guide member, or the engaging surface 32' of the adaptor, because the groove 30 or 30' is provided for the same, thus preventing an abrasion of the surface 32, which would cause a loose fit between the guide member and the bit, interfering with the proper guiding of the bit by said guide member.

The groove 30 or 30' is made on a helix or spiral that is of a pitch corresponding to the direction of rotation of the drill. Thus, if the drill operates by right hand rotation, as is usually the case, the groove 30 or 30' will be made of the character of a right-hand thread. This prevents traveling of the liquid and cutting compound upwardly in the groove to the end thereof remote from the work, due to the rotation of the bit, the tendency being for the rotation to cause a downward travel of the material in the groove, rather than an upward travel thereof, or in other words, a travel toward the cutting edge of the bit.

The drill is particularly designed to be used as a portable tool, and is made as light as possible, the metallic parts being preferably made of a light weight metal, no heavier than is necessary for operation and lasting qualities of the tool. The suction ring has enough of a cushioning action, that if the drill is held out of line the suction will be broken on one side of the device to warn the operator that he is not operating the drill properly. The cushioning ring 16 also takes up the shock when the drill is first applied to the work, and when there is any irregularity in the drilling action due to variation in the quality of the material that is being drilled.

What I claim is:—

1. In a drill of the character described, a tubular bit, said bit having slits in the wall thereof providing weakened portions adapted to be broken out of the same as said bit wears to provide notches in the cutting edge thereof.

2. In a drill of the character described, a tubular bit, said bit having slits in the wall thereof providing weakened portions adapted to be broken out of the same as said bit wears to provide notches in the cutting edge thereof, said slits being so arranged in said wall as to provide rows of said weakened portions extending around said bit, the weakened portions in adjacent rows being staggered.

3. In a drill of the character described, a tubular bit, said bit having slits in the wall thereof providing weakened portions adapted to be broken out of the same as said bit wears to provide notches in the cutting edge thereof, said slits comprising pairs of adjacent substantially parallel longitudinal portions and end portions converging from said substantially parallel portions at one end thereof.

4. The combination with a drill of a guide member therefor having an annular portion embracing said drill provided with a groove therein and a yieldable cushioning member mounted in said groove and forming a seal between the work and said guide member, said cushioning member having suction work gripping means thereon.

5. The combination with an annular drill of an annular guide member receiving said drill, and an abrasive holder within said drill, said guide member being cut away adjacent said drill to provide an annular pocket between said drill and guide member adjacent the work.

6. The combination with a drill of a guide member therefor comprising a tubular portion extending along the body portion of said drill a substantial distance, said tubular portion fitting said drill closely and having a spiral groove therein, said groove having a pitch corresponding to the direction of rotation of said drill.

7. The combination with a tubular bit of a drilling compound retainer mounted in said bit adjacent the cutting edge thereof, said retainer having means engaging said bit to rotate said retainer with said bit and permit said retainer to move longitudinally into said bit as said bit wears or enters the work at its cutting edge.

8. The combination with a tubular bit of a drilling compound retainer mounted in said bit for rotation therewith, said retainer having a cupped compound receiving portion provided with compound ejecting openings therein.

9. The combination with a tubular bit of uniform diameter from end to end, of a drilling compound retainer housed entirely within said bit and resilient means on said retainer engaging the inner face of said tubular bit to cause said retainer to rotate with said bit.

10. The combination with a tubular bit, of a drilling compound retainer mounted in said bit for rotation therewith, said retainer having a disk-like bottom wall having mounted thereon a cupped compound receiving portion provided with compound ejecting openings therein.

11. The combination with a tubular bit, of a drilling compound retainer mounted in said bit for rotation therewith, said retainer having a tubular body portion fitting slidably in said bit, from which depends a cupped compound receiving portion provided with compound ejecting openings therein.

RALPH A. HAWN.